(12) United States Patent
Ciano et al.

(10) Patent No.: US 8,863,125 B2
(45) Date of Patent: *Oct. 14, 2014

(54) OPTIMIZATION OF VIRTUAL APPLIANCE DEPLOYMENT

(75) Inventors: Giuseppe Ciano, Rome (IT); Scot MacLellan, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/621,148

(22) Filed: Sep. 15, 2012

(65) Prior Publication Data

US 2013/0014111 A1 Jan. 10, 2013

Related U.S. Application Data

(63) Continuation of application No. 13/284,965, filed on Oct. 30, 2011.

(30) Foreign Application Priority Data

Nov. 23, 2010 (EP) .................................. 10192267

(51) Int. Cl.
G06F 9/455 (2006.01)
G06F 9/445 (2006.01)

(52) U.S. Cl.
CPC .............. G06F 9/45558 (2013.01); G06F 8/60 (2013.01)
USPC ............................................. 718/1; 717/174

(58) Field of Classification Search
USPC ............................................... 718/1; 717/174
See application file for complete search history.

(56) References Cited

U.S. PATENT DOCUMENTS

| 7,313,512 | B1 | 12/2007 | Traut et al. | |
| 2008/0004094 | A1 | 1/2008 | Mueller et al. | |
| 2008/0134176 | A1 | 6/2008 | Fitzgerald et al. | |
| 2009/0217296 | A1 | 8/2009 | Gebhart et al. | |
| 2009/0222560 | A1* | 9/2009 | Gopisetty et al. | 709/226 |
| 2009/0228984 | A1 | 9/2009 | Sterin | |
| 2009/0249329 | A1 | 10/2009 | Dash | |
| 2009/0300641 | A1 | 12/2009 | Friedman et al. | |
| 2009/0328225 | A1 | 12/2009 | Chambers et al. | |
| 2010/0306767 | A1* | 12/2010 | Dehaan | 718/1 |
| 2013/0007279 | A1* | 1/2013 | Banerjee et al. | 709/226 |

* cited by examiner

*Primary Examiner* — Diem Cao
(74) *Attorney, Agent, or Firm* — Brevetto Law Group

(57) ABSTRACT

In an embodiment for deploying a new virtual appliance (225) on a data processing center (100) structure information of the new virtual appliance is determined (509-521). The structure information of the new virtual appliance includes an indication of the new virtual machines and an indication of the new software programs of each new virtual machine. Configuration information indicative of a current configuration of the data processing center is retrieved (527). License condition information indicative of license conditions applicable to the data processing center is also retrieved (530-533). A deployment scheme of the virtual appliance on the data processing center is then determined (539,548). The determination of the deployment scheme is performed by optimizing a cost function based on the license condition information, the configuration information and the structure information, and the new virtual appliance may be deployed (551) according to the deployment scheme.

13 Claims, 7 Drawing Sheets

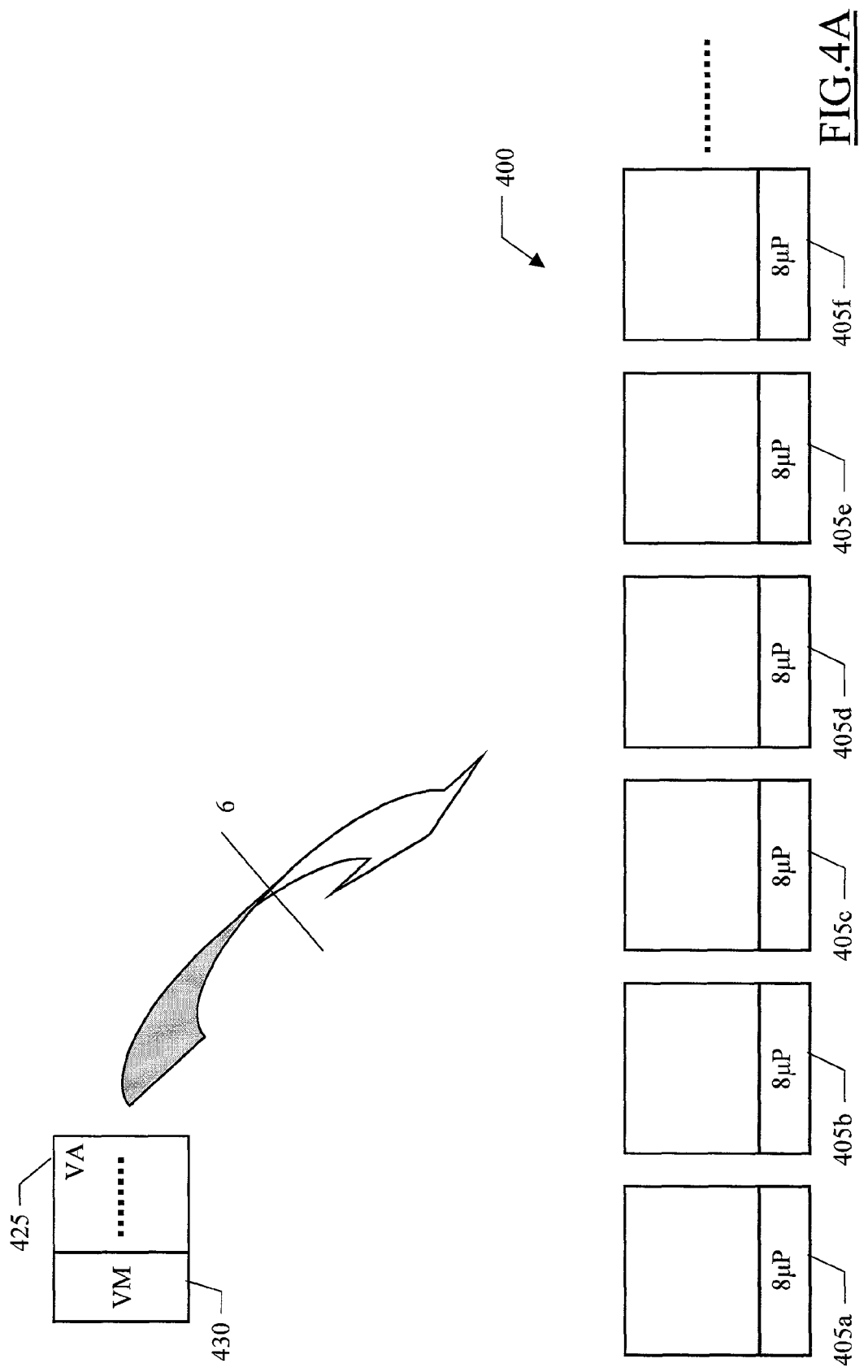

OPTIMIZATION OF VIRTUAL APPLIANCE DEPLOYMENT

CROSS-REFERENCE TO RELATED APPLICATIONS

This application is related to, claims priority from, and hereby incorporates by reference in its respective entirety U.S. patent application Ser. No. 13/284,965.

BACKGROUND

1. Field of the Invention

Various embodiments disclosed herein relate to the data processing field. More specifically, various embodiments relates to the deployment of virtual appliances.

2. Description of Related Art

Virtual appliances are a specific type of software appliances. In general, a software appliance is a software solution including a software application (i.e., one or more application programs performing a specific user task) and a Just Enough Operating System, or JeOS (i.e., a limited operating system specifically tailored to support the software application), which are encapsulated in a pre-built, self-contained unit; the software appliance provides a simplified management (i.e., development, deployment and maintenance) and an improved isolation (with respect to a standard software application running on a full general-purpose operating system).

In particular, a virtual appliance is a software appliance designed to run in a virtualization environment; for this purpose, the virtual appliance includes one or more virtual machines (i.e., emulations by software of physical machines), each one with a corresponding operating system and application programs. Virtual appliances are particularly advantageous in cloud computing (wherein multiple services are provided to computers on demand) and in grid computing (wherein multiple loosely coupled computers cooperate to perform very complex tasks); indeed, in these cases virtual appliances allow provisioning cloud/grid nodes in a very simple and fast way. Moreover, the virtual appliances allow the delivery of software applications designed to run locally in a Software as a Service (SaaS) mode (wherein they are exploited on a pay-per-use base), without requiring the re-design of the software applications for multi-tenancy (wherein single instances thereof run on servers for multiple clients, or tenants).

A problem of the virtual appliances is the difficulty of ensuring their compliance with applicable license conditions in a data processing center (including one or more physical machines, or computers) wherein they are to be deployed.

For this purpose, some techniques have been proposed in the art.

For example, US-A-2008/0134176 (the entire disclosure of which is herein incorporated by reference) discloses a technique for enforcing compliance of a virtual machine (or any other virtual environment, including a virtual appliance) to compliance policies (including licensing requirements). For this purpose, management information about the virtual machines (including what applications are installed and which ones are automatically started) is generated and saved (for example, when the virtual machine is created, discovered or registered); when a request to execute the virtual machine is detected, this information is checked against the compliance policies before the virtual machine is allowed to execute; moreover, it is also possible to adapt the virtual machine (either temporary or permanently) so as to fulfill the compliance policies (for example, by obtaining necessary licensing or issuing corresponding notifications to an administrator).

US-A-2009/0249329 (the entire disclosure of which is herein incorporated by reference) discloses a technique for enforcing license compliance of a software application provided as a service within a virtual machine. For this purpose, licensing restrictions are added as metadata to an image of the virtual machine; whenever a user attempts to initiate the virtual machine, a virtual machine loader checks the licensing restrictions in order to allow or prevent the loading of the virtual machine. Alternatively, the same operation may also be performed whenever the virtual machine is started by a corresponding BIOS (retrieving the licensing restrictions from a virtual disk), or whenever the virtual machine moves between a kernel mode of operation and a device access mode of operation by a licensing mode enforcement service.

US-A-2009/0228984 (the entire disclosure of which is herein incorporated by reference) discloses a technique for enforcing license compliance in a computer (including a virtual machine). For this purpose, when a new software is to be deployed, a configuration manager determines whether additional licenses are needed, according to information extracted from a licensing data store (wherein the licenses are classified in a taxonomy) and information gathered about the virtual machine. If additional licenses are need, the configuration manager determines what action is required (for example, stopping the deployment or providing a notification) according to predefined business rules, and it may also provide a cost analysis of the additional licenses.

U.S. Pat. No. 7,313,512 (the entire disclosure of which is herein incorporated by reference) discloses a technique for licensing software in an emulated computing environment. For this purpose, whenever a virtual machine is loaded the corresponding operating system determines whether it is a guest operating system running on a virtual machine instead of on a physical machine (for example, in response to the detection of a license card consisting of an emulated hardware device). An emulation program requests a license key for the guest operating system from a key server (maintaining a corresponding count). If the license key is available, the guest operating system can complete its initialization; conversely, when the count of the license keys becomes zero the emulation program interrupts the initialization of the guest operating system thereby preventing the virtual machine from running.

US-A-2009/0328225 (the entire disclosure of which is herein incorporated by reference) discloses a technique for controlling execution of application programs within virtual machines. For this purpose, whenever an application program is loaded for execution, a corresponding initialization routine calls a licensing module. In turn, the licensing module queries a virtual policy enforcer layer (outside the virtual machine), which allows or prevents the execution of the application program according to the result of an authentication of the application program against a license permission file.

However, all the above-mentioned documents require that the virtual machines should already be deployed and started before verifying their compliance with the license conditions (so that corresponding actions—for example, preventing the loading of the virtual machines—may be taken). Therefore, these techniques are mainly based on an enforcement scheme, wherein the only purpose of the verification is of maintaining the license compliance.

Moreover, US-A-2009/0217296 (the entire disclosure of which is herein incorporated by reference) discloses a technique for determining the benefit of implementing virtualization technologies. For this purpose, a set of agents (each one in a corresponding virtual machine) or a single agent (in a virtual machine controller) gathers information about operation of the virtual machines relevant to the benefit analysis (for example, their starting, closure, upgrade, or migration); a central data collector collects (and aggregates) this information. The collected information and static information relevant to the benefit analysis (for example, physical machine characteristics and costs, virtual machine characteristics and costs—including license fees) are stored in a central database. A virtual infrastructure optimizer determines a benefit of implementing virtualization technologies, as a difference between a total cost of ownership based on physical machines and a total cost of ownership based on virtual machines being determined according to the collected information (over a predetermined period—for example, a month) and the static information. In addition, it is also possible to sent alerts providing suggested actions (for example, installing more virtual machines to take advantage of unused benefits or disable virtual machines to save corresponding costs).

However, this document is completely silent about the deployment of virtual appliances (and of their licensing compliance).

Therefore, the task of ensuring the license compliance of a data processing center remains very complex. This problem is particular acute in large virtual appliances—for example, conforming to the Service Oriented Architecture, or SOA (providing a suite of loosely coupled services). Indeed, in this case each virtual appliance may include multiple application tiers, each one of them in turn including multiple virtual machines (for example, a typical web application with a web tier implementing a presentation logic, an application server tier implementing a business logic, and a back-end database tier implementing a data management logic). Moreover, the problem is exacerbated in cloud computing, wherein a high number of heterogeneous virtual appliances are continually requested (as a sort of infinite resources). Moreover, the problem is very difficult to manage because of the large variety of license conditions that are provided by different vendors of the virtual appliances.

It is then not possible to manage the deployment of the virtual appliances in an efficient way (since it is very difficult to cope with the problem manually for a system administrator). This may have a detrimental effect on the cost of ownership of the data processing center. In any case, the result strongly depends on the skill of the system administrator.

SUMMARY

Various embodiments disclosed herein involve optimizing the deployment of the virtual appliances. Various embodiments provide a deployment method for deploying a new virtual appliance on a data processing center, which includes a set of (one or more) computers each one for hosting a set of virtual machines. The new virtual appliance includes a set of (one or more) new virtual machines each one including a set of (one or more) new software programs. The deployment method includes the following steps. Structure information of the new virtual appliance is determined (for example, by extracting it from an appliance repository if available, or discovering it from an image of the new virtual appliance and storing it into the appliance repository otherwise). The structure information of the new virtual appliance includes an indication of the new virtual machines and an indication of the new software programs of each new virtual machine. Configuration information indicative of a current configuration of the data processing center can be retrieved (for example, indicating the virtual appliances, with their virtual machines and software programs, which are already deployed on the data processing center, and/or indicating the physical resources of each computer and the virtual resources assigned to each virtual machine thereof). In some embodiments license condition information indicative of license conditions applicable to the data processing center is also retrieved (for example, charging the usage of virtual appliances/software programs according to a number of their instances and/or according to an amount of physical/virtual resources that are allocated thereto). Various embodiments determine a deployment scheme of the virtual appliance on the data processing center. The determination of the deployment scheme may be performed by optimizing a cost function based on the license condition information, the configuration information and the structure information (and possibly constrained according to license entitlements available in the data processing center— for example, defining a maximum number of instances of virtual appliances/software programs and/or a maximum amount of physical/virtual resources allocated thereto). At this point, the new virtual appliance may be deployed according to the deployment scheme (for example, by creating new virtual machines and/or customizing virtual machines already deployed in the data processing center, with a warning message that may instead be provided when it is not possible to deploy the new virtual appliance maintaining the data processing center compliant with the license entitlements).

Other embodiments disclosed herein provide a computer program for performing the method.

Yet other embodiments disclosed herein provide a corresponding data processing system.

BRIEF DESCRIPTION OF THE DRAWINGS

The various embodiments, as well as further features and the advantages thereof, may be best understood with reference to the following detailed description, given purely by way of a non-restrictive indication, to be read in conjunction with the accompanying drawings (wherein corresponding elements are denoted with equal or similar references and their explanation is not repeated for the sake of brevity). Particularly:

FIG. 4A-FIG. 4B show another exemplary scenario of application of the solution according to various embodiments disclosed herein.

DETAILED DESCRIPTION

Figure 1:
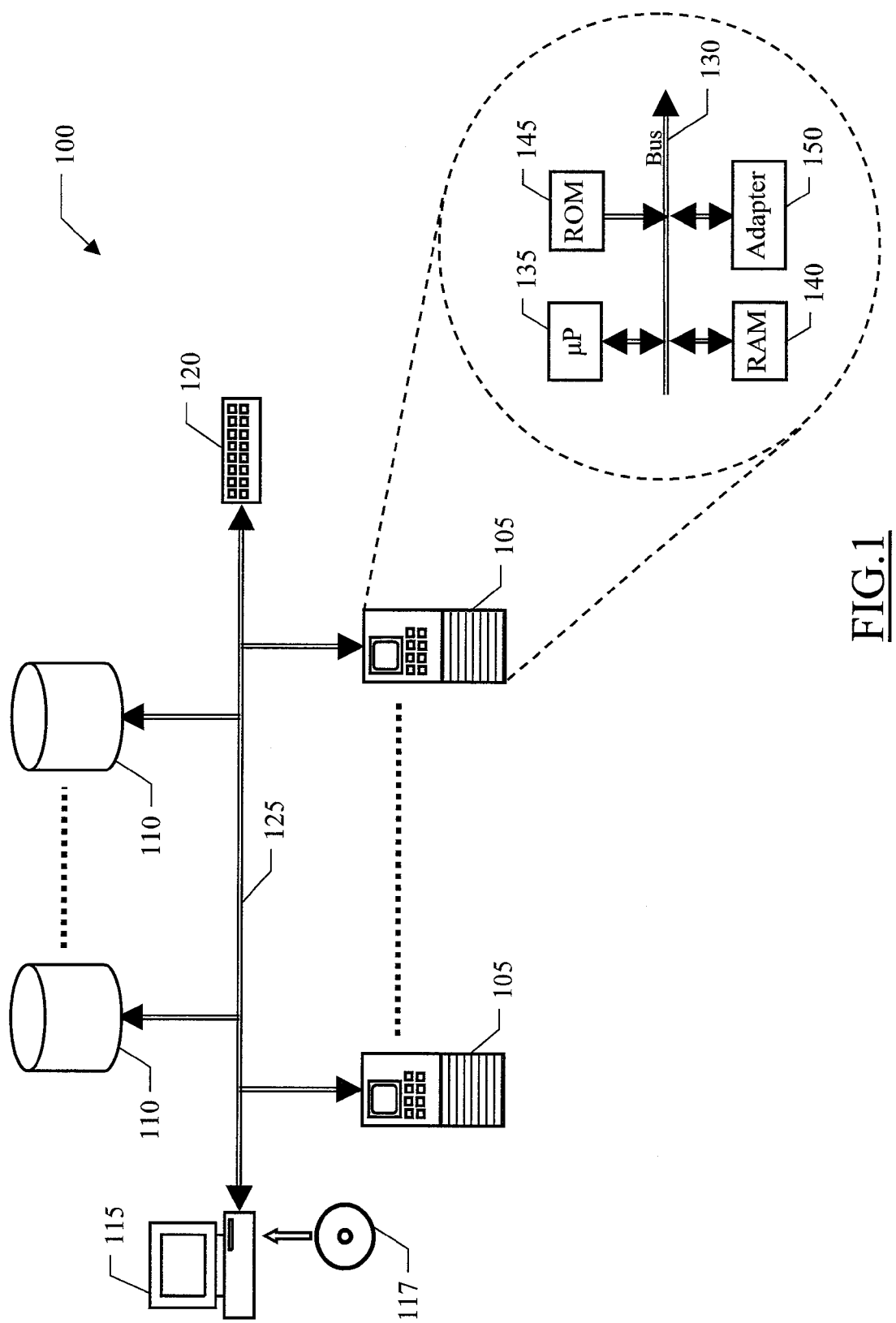
FIG. 1 shows a schematic block diagram of a data processing center according various embodiments disclosed herein.

With reference in particular to FIG. 1, a schematic block diagram of a data processing center 100 (according to at least one embodiment disclosed herein) is shown. The data processing center 100 is a facility that includes a set of (one or more) computers 105, a set of (one or more) storage systems 110, and a console 115 for operating them (which console 115 may also be provided with a drive for reading DVD- or CD-ROMs 117). A router (or switch) system 120 manages communications among the computers 105, the storage systems 110 and the console 115, and with the outside of the data processing center 100 (for example, through the Internet). For these purposes, the computers 105, the storage systems 110 and the console 115 are connected to the router system 120 through a cabling system 125.

A generic computer 105 of the data processing center 100 is formed by several units that are connected in parallel to a communication bus 130. In detail, a set of (one or more) microprocessors (μP) 135 controls operation of the computer 105; a RAM 140 is directly used as a working memory by the microprocessors 135, and a ROM 145 stores basic code for a bootstrap of the computer 105. Moreover, the computer 105 includes a network adapter 150, which is used to connect the computer 105 to the cabling system 125.

Figure 2:
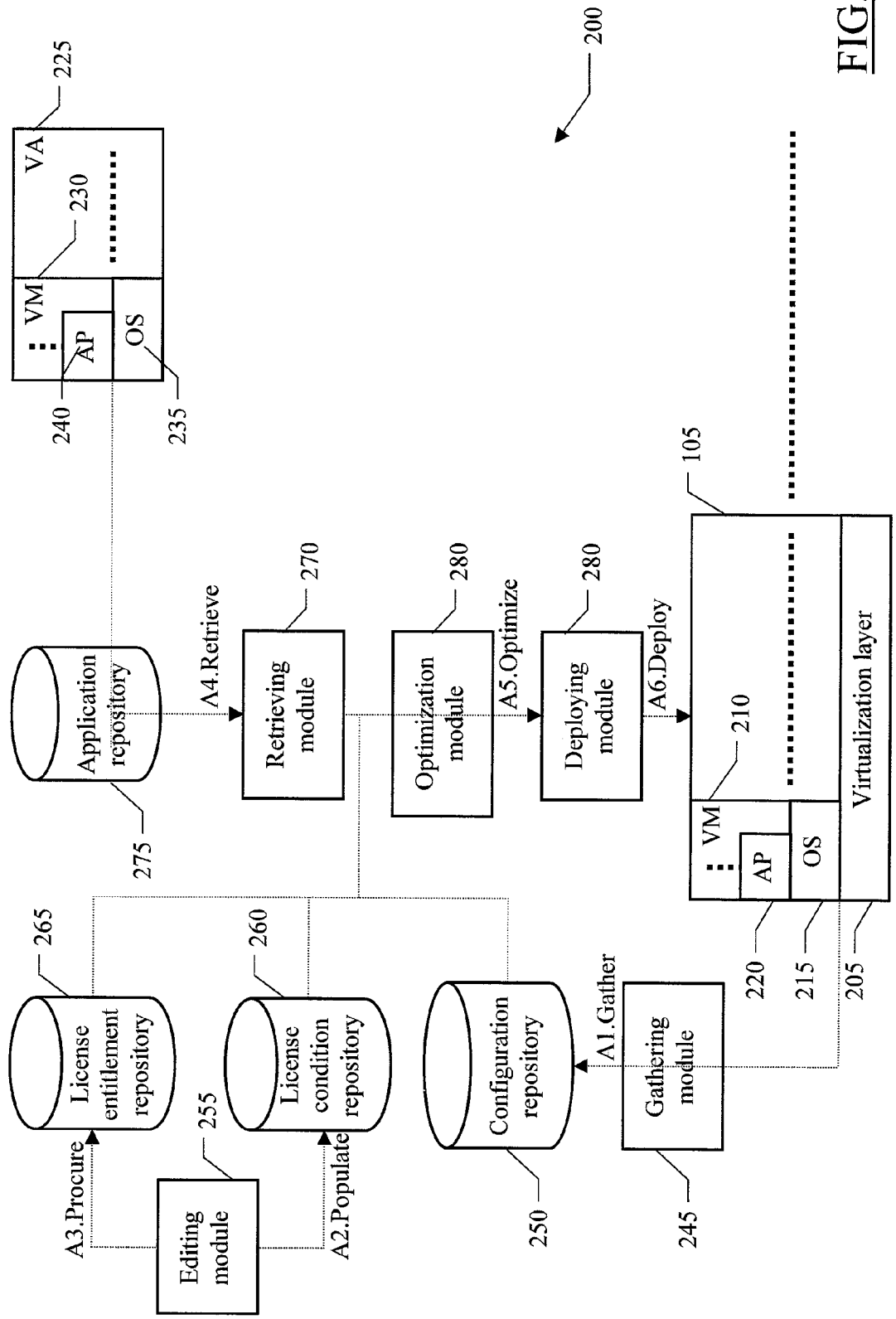
FIG. 2 shows a collaboration diagram representing the roles of the main software components that may be used to implement according various embodiments disclosed herein.

FIG. 2 shows a collaboration diagram representing the roles of the main software components that may be used to implement the solution according to various embodiments. These software components are denoted as a whole with the reference 200. The information (programs and data) is typically stored on the hard-disk and loaded (at least partially) into the working memory of each computer when the software programs are running. The software programs are initially installed onto the hard disk, for example, from DVD-ROM. Particularly, the figure describes the static structure of the system (by means of the corresponding components) and its dynamic behavior (by means of a series of exchanged messages, each one representing a corresponding action, denoted with sequence numbers preceded by the symbol "A").

In particular, each computer 105 of the data processing center includes a virtualization layer (or hypervisor) 205, which emulates a set of (one or more) virtual machines 210 (hosted on the computer 105); each virtual machine 210 consists of an abstract environment giving the appearance of a physical machine (which the virtual machine has sole control of). An example of commercial virtualization layer is VMware from VMware, Inc. Palo Alto, USA. In turn, each virtual machine 210 includes a corresponding operating system 215 defining its software platform (which works as if it was installed on a real computer). A set of (one or more) application programs 220 runs on top of the operating system 215.

In the solution according to various embodiments (as described in detail in the following) a collection of software entities is added to manage the deployment of new virtual appliances on the data processing center (for example, being installed on a dedicated computer of the data processing center, not shown in the figure). A generic one of these new virtual appliances is denoted in the figure with the reference 225; the new virtual appliance 225 includes a set of (one or more) virtual machines 230, each one including a corresponding operating system 235 (of the JeOS type) and a set of (one or more) application programs 240.

Particularly, a gathering module 245 interfaces with all the virtualization layers 250 (either remotely or locally), in order to gather configuration information indicative of a current configuration of the data processing center. Particularly, the configuration information indicates the virtual appliances that are already deployed on the data processing center 110; each deployed virtual appliance is defined by its virtual machines 210 and the software programs (e.g., the operating system 215 and the application programs 220) that are installed thereon. The configuration information also indicates physical resources of each computer 105 (for example, its number of microprocessors), and virtual resources that are emulated (by the virtualization layer 205) to each virtual machine 210 thereof. The gathering module 245 stores the configuration information into a configuration repository 250 (action "A1.Gather").

An editing module 255 is used to edit a license condition repository 260 for its population (action "A2.Populate"). The license condition repository 260 stores license condition information indicative of license conditions applicable in the data processing center (for example, charging the usage of virtual appliances/software programs according to a number of instances of each virtual appliance/software program that are installed/executed on a single computer, a subset of computers or the whole data processing center, and/or according to an amount of physical/virtual resources that are allocated thereto). Optionally, the same editing module 255 is also used to edit a license entitlement repository 265 in a procurement phase (action "A3.Procure"). The license entitlement repository 265 stores license entitlement information indicative of license entitlements available in the data processing center (for example, a maximum number of instances of each virtual appliance/software program that may be installed/executed on a single computer, a subset of computers or the whole data processing center, and/or a maximum amount of physical/virtual resources that may be allocated thereto).

A retrieving module 270 retrieves structure information indicative of a structure of the new virtual appliance 225— e.g., its virtual machines 230 with the corresponding software programs 235 and 240—e.g., operating system and application programs, respectively (action "A4.Retrive"). For this purpose, the retrieving module 270 extracts the structure information of the new virtual appliance 225 (if available) from an appliance repository 275, which stores the structure information of a set of known virtual appliances (for example, previously deployed on the data processing center); otherwise, the retrieving module 270 discovers the structure information directly from the new virtual appliance 225 (and saves it into the structure repository 275 too).

An optimization module 280 interfaces with the retrieving module 270, the configuration repository 250, the license condition repository 260, and the (possible) license entitlement repository 265. The optimization module 280 determines a deployment scheme of the new virtual appliance 225 (for example, involving the deployment of new virtual machines and/or the customization of deployed virtual machines) so as to optimize its deployment on the data processing center from a license point of view (action A5.Optimize"). For this purpose, the optimization module 280 determines a new configuration of the data processing center, resulting from its current configuration (as defined by the configuration information from the configuration repository 250) after the deployment of the new virtual appliance 225 (as defined by its structure information from the retrieving module 270). The new configuration of the data processing center is determined so as to provide an optimized usage of the applicable license conditions (as defined by the license condition information from the license condition repository 260); optionally, the same new configuration of the data processing center is also determined with the constraint of maintaining it compliant with the license entitlements (as defined by the license entitlement information from the license entitlement repository 265).

A deploying module 285 deploys the new virtual appliance 225 on the data processing center according to its deployment scheme, provided by the optimization module 280 (action "A6.Deploy"). Particularly, the deploying module 285 creates any new virtual machines 230, with their software products 235,240; moreover, the deploying module 285 possibly customizes deployed virtual machines 210 (to fulfill the requirements of the new virtual appliance 225 and/or the license entitlements).

The above-described solution according to various embodiments allows managing the deployment of the virtual appliances in an efficient way. This has a beneficial effect on the cost of ownership of the data processing center (for the corresponding licenses). The desired result is achieved completely (or at least substantially) in an automatic way, so that it is independent of any human factor.

These advantages are especially perceived in complex virtual appliances with multiple virtual machines (for example, conforming to the SOA), and in cloud computing (with a high number of heterogeneous virtual appliances). Moreover, the proposed solution is particularly useful when a large variety of license conditions are provided.

In any case, the proposed solution allows verifying the compliance of the data processing center (with the applicable license conditions) before any new virtual appliance is deployed. In this way, it is possible to adjust the virtual machines to be deployed and/or the virtual machines already deployed so as to ensure that the data processing center maintains its compliance even after the deployment of the new virtual appliance (or to warn a system administrator when the compliance cannot be maintained so as to allow him/her to take appropriate actions).

Figure 3A:
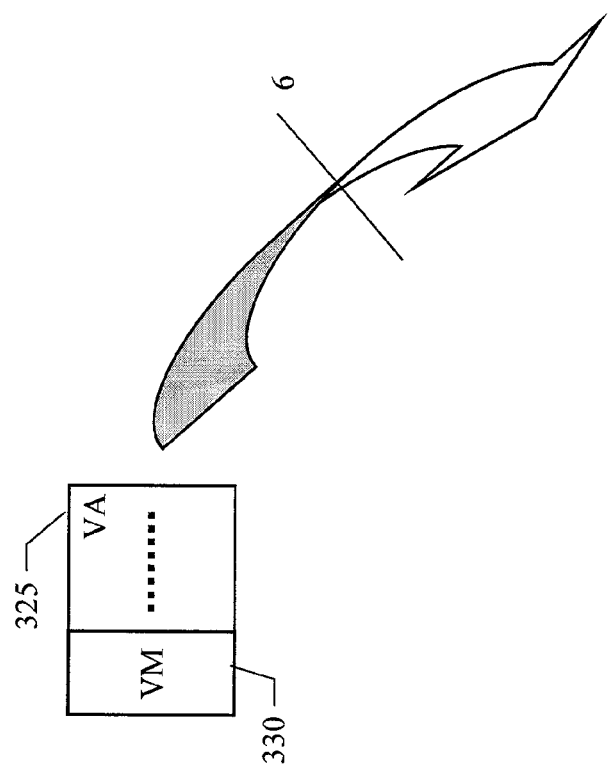
FIG. 3A-FIG. 3B show an exemplary scenario of application of the solution according to various embodiments disclosed herein.
Figure 3A:
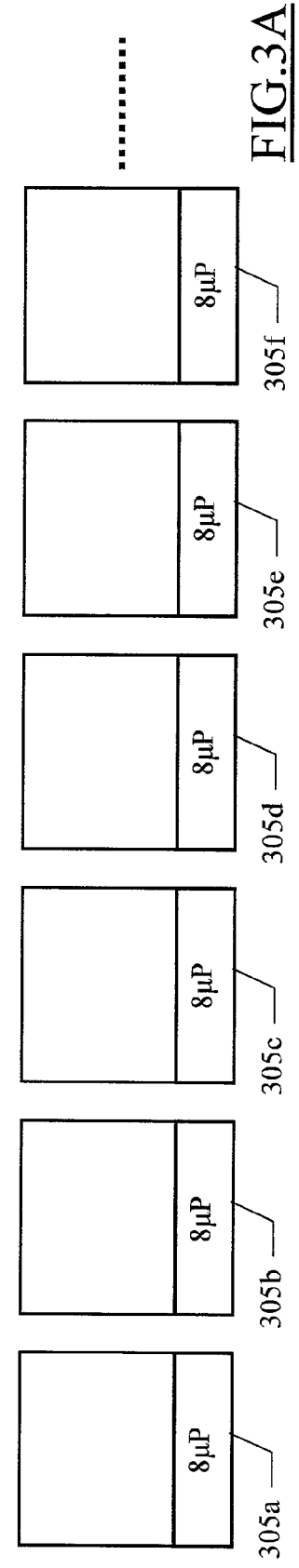
Figure 3B:
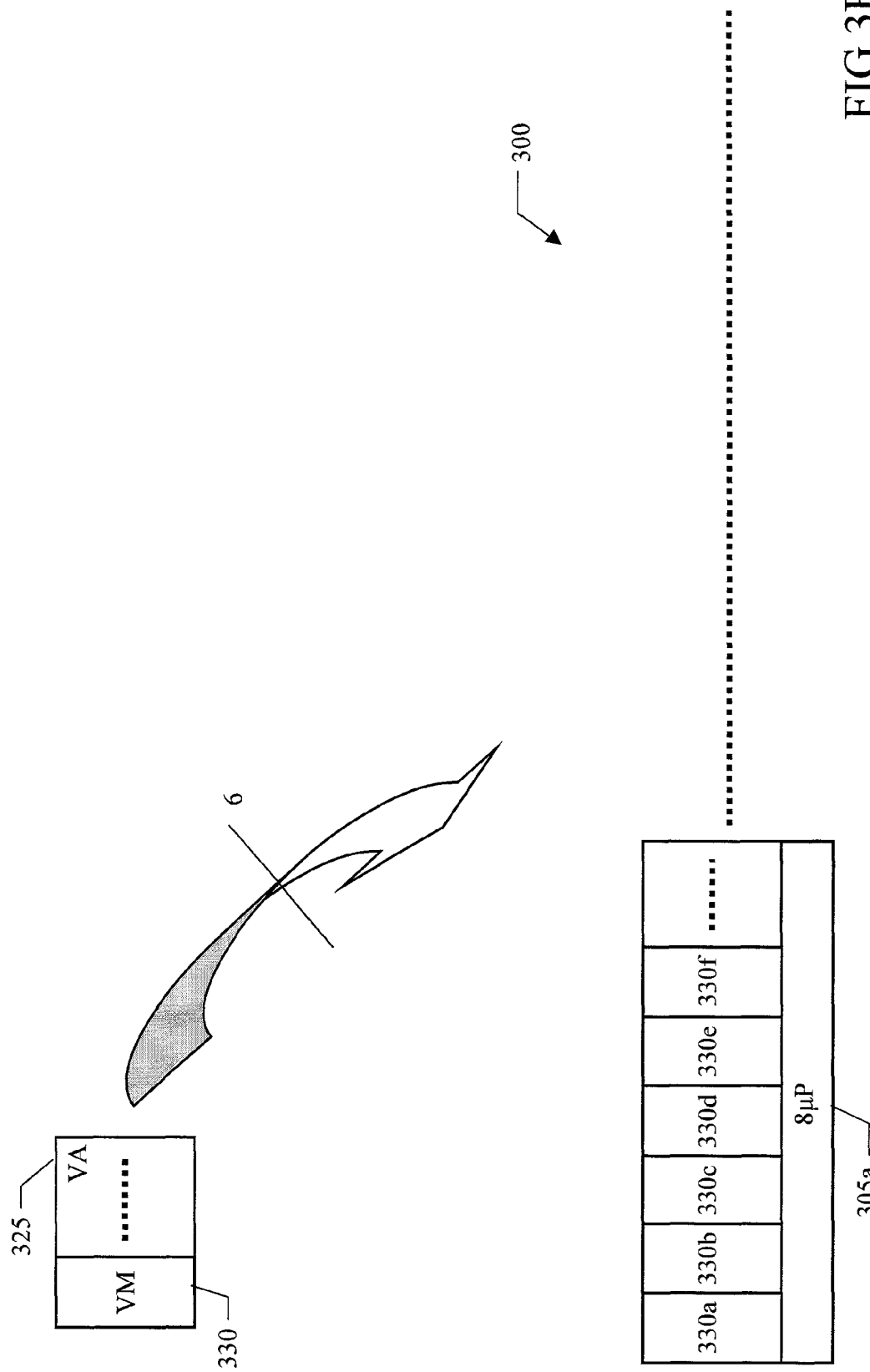

An exemplary scenario of application of the solution according to various embodiments is shown in FIG. 3A-FIG. 3B.

Starting from FIG. 3A, let us consider a virtual appliance 325 that has to be deployed in 6 instances on a data processing center 300, which includes at least 6 computers 305a, 305b, 305c, 305d, 305e and 305f each one having 8 microprocessors. The virtual appliance 325 includes a virtual machine 330 with a software program (not shown in the figure) that is subject to a license condition of the full-capacity type; in this case, the usage of the software program on each computer is charged according to a charging factor equal to the number of microprocessors thereof (irrespectively of the microprocessors assigned to its virtual machine).

In this case, as shown in FIG. 3B, the best deployment scheme of the virtual appliance 325 is when all the 6 instances of this virtual machine (denoted with the references 330a, 330b, 330c, 330d, 330e and 330f) are deployed on a single computer (for example, the computer 305a). Indeed, all the corresponding instances of the software program are now running on the computer 305a, so that their charging factor is 1×8=8. It is then possible to achieve a significant cost saving, with respect to the worst deployment scheme wherein each one of the virtual machines 330a-330f is deployed on a different computer 305a-305f (in which case, each corresponding instance of the software program is now running on a different computer, so that their charging factor is 6×8=48).

Figure 4B:
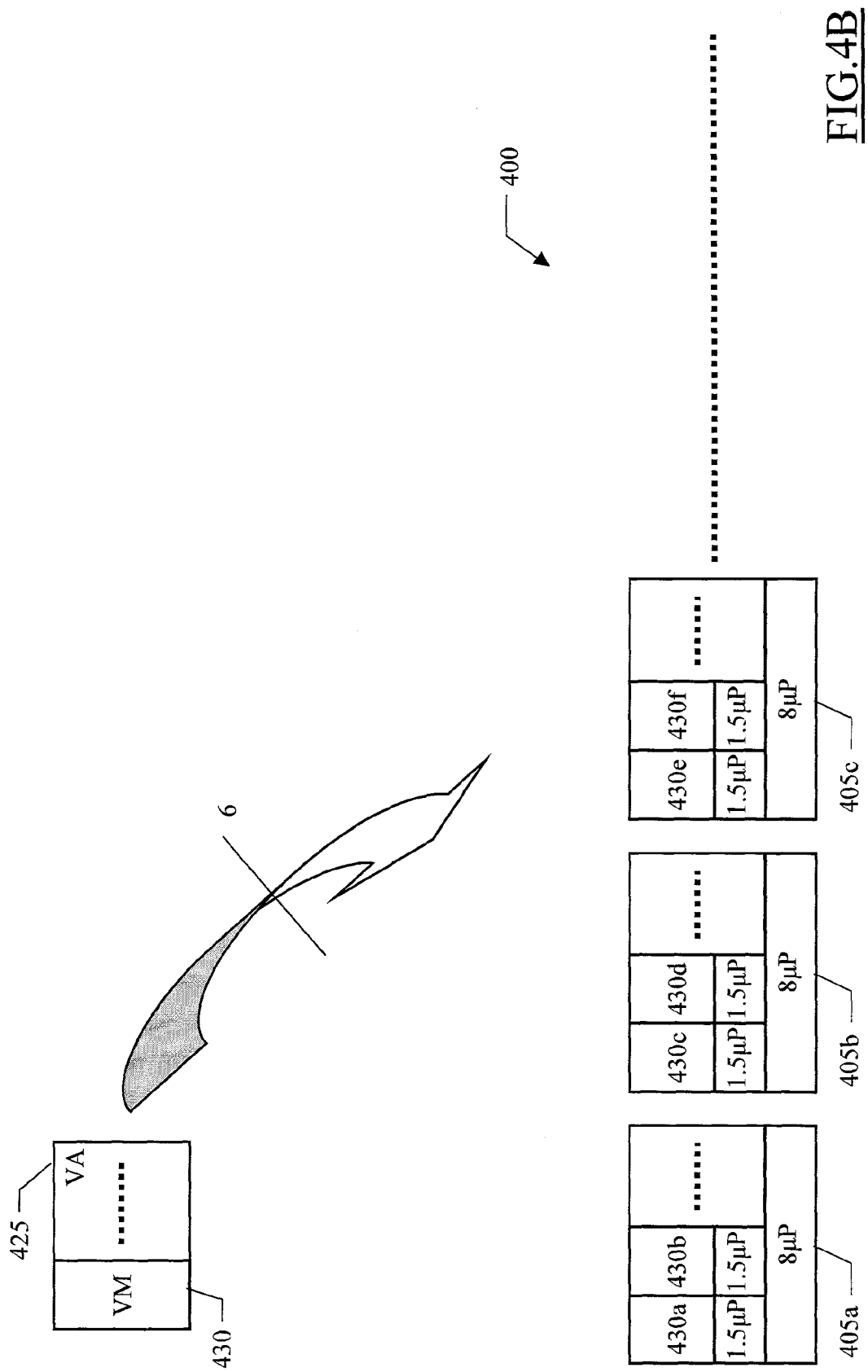

Another exemplary scenario of application of the solution according to various embodiments is shown in FIG. 4A-FIG. 4B.

Starting from FIG. 4A, as above let us consider a virtual appliance 425 that has to be deployed in 6 instances on a data processing center 400, which includes at least 6 computers 405a, 405b, 405c, 405d, 405e and 405f each one having 8 microprocessors. The virtual appliance 425 includes a virtual machine 430 with a software program (not shown in the figure) that is now subject to a license condition of the sub-capacity type; in this case, the usage of the software program is charged according to a charging factor equal to the number of microprocessors actually available to the software program (rounded up to the next integer number for each computer).

Therefore, the charging factor of the software program will be equal to the number of (virtual) microprocessors assigned to its virtual machine 430; particularly, let us assume that the virtual machine 430 requires a factional number of virtual microprocessors (for example, 1.5).

In this case, as shown in FIG. 4B, the best deployment scheme of the virtual appliance 425 is when the 6 instances of this virtual machine (denoted with the references 430a, 430b, 430c, 430d, 430e and 430f) are deployed in even number on each computer (for example, the virtual machines 430a,430b on the computer 405a, the virtual machines 430c,430d on the computer 405b, and the virtual machines 430e,430f on the computer 405c). Indeed, the virtual machines 430a-430f on each computer 405a-405c are now assigned a total number of virtual microprocessors that is integer, so that the charging factor of the corresponding instances of the software program is only INT[1.5×2]×3=3×3=9. It is then possible to achieve a significant cost saving, with respect to the worst deployment scheme wherein each one of the virtual machines 430a-430f is deployed on a different computer 405a-405f (in which case, the virtual machine 430a-430f on each computer 405-405c is assigned a fractional number of virtual microprocessors, so that the charging factor of the corresponding instances of the software program is INT[1.5]×6=2×6=12).

Figure 5:
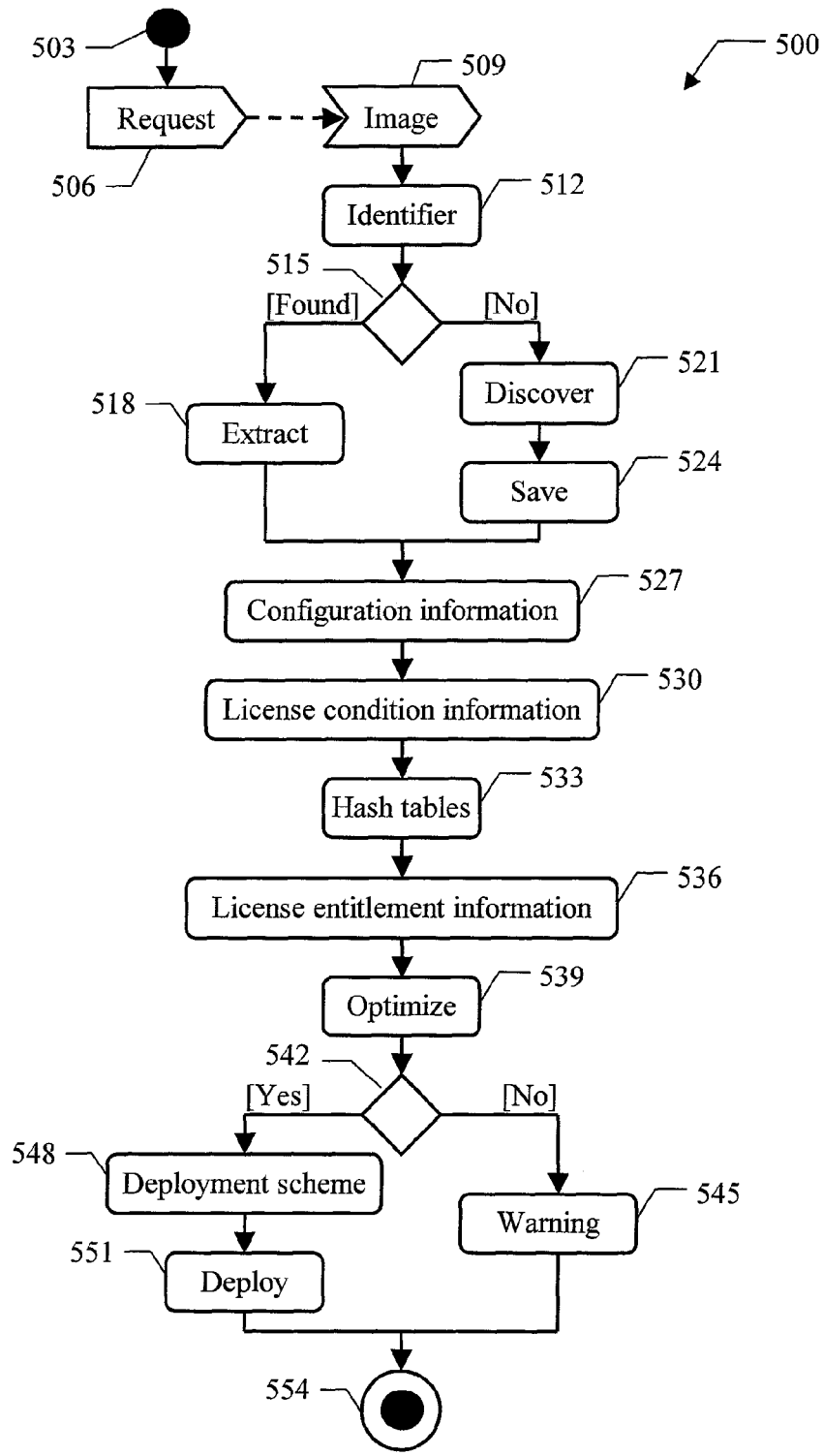
FIG. 5 shows a diagram describing the flow of activities relating to an implementation of the solution according to at least one embodiment disclosed herein.

A diagram describing the flow of activities relating to an implementation of the solution according to various embodiments is shown in FIG. 5. Particularly, the diagram represents an exemplary process that can be implemented in the above-described system (for deploying virtual appliances) with a method 500.

The method 500 begins at the black start circle 503, and then passes to block 506. As soon as a request to deploy a new virtual appliance is received, the flow of activity passes to block 509, wherein an image of the new virtual appliance (packaging the new virtual appliance for its distribution) is retrieved (for example, from the Internet). Continuing to block 512, a unique identifier VAn of the new virtual appliance is calculated. The identifier VAn has the following format:

VAn=myVENDOR_myID, where myVENDOR is a field representing a vendor of the new virtual appliance, and myID is a field representing a signature of the new virtual appliance. For example, when the new virtual appliance is packaged according to the Open Virtualization Format (OVF) specification, the field myVENDOR is retrieved from the ProductSection element (between the tags <VENDOR> and <\VENDOR>) of the descriptor file (extension .ovf); the field myID is instead retrieved from the VirtualSystem element (as the "value" in the tag <VirtualSystem ovf:id="value">) or from the VirtualSystemCollection element (as the "value" in the tag <VirtualSystemCollection ovf:id="value">) of the same descriptor file (when the new virtual appliance includes a single virtual machine or a collection of virtual machines, respectively). Otherwise, when the new virtual appliance is packaged according to a proprietary format (for example, VMware), the field myVENDOR is set to the name of the vendor (for example, extracted from a configuration file of the new virtual appliance—extension .vmx in VMware), and the field myID is set to a hash of the same configuration file.

A test is now made at block 515 to verify whether the structure information of the new virtual appliance is available in the structure repository. For example, the structure repository includes a record for each known virtual appliance (already deployed on the data processing center); the record includes a unique identifier VA of the known virtual appliance, and a data field for its structure information having the following format:

VM1(SP1, ... SPm$_1$), ... VMn(SP1, ... SPm$_n$), where VMi (with i=1 ... n) identifies each virtual machine of the known virtual appliance, and SPi$_j$ (with j=1 ... m$_i$) identifies each software product (with corresponding version and release) of the virtual machine VM$_i$.

If the structure information of the new virtual appliance is available in the structure repository (e.g., a record is found with VA=VAn), the structure information of the new virtual appliance is directly extracted from the data field of this record at block 518.

Conversely, if the structure information of the new virtual appliance is not available in the structure repository (e.g., no record is found with VA=VAn), the process descends into block 521. In this phase, the structure information of the new virtual appliance is discovered from its image. For example, when the new virtual appliance is packaged according to the OVF specification and its image is signed by the vendor (so as to guarantee the content thereof), its single virtual machine is determined from the VirtualSystem element or each one of its multiple virtual machines is determined from the corresponding VirtualSystem element of the VirtualSystemCollection element (as the "value" in the tag <VirtualSystem ovf:id="value">); for each virtual machine, each one of its software products is determined from the corresponding ProductSection element in the VirtualSection element (between the tags <Product> and <\Product> and between the tags <FullVersion> and <\FullVersion>). Otherwise, when the image of the new virtual appliance is not signed and/or when the new virtual appliance is packaged in a proprietary format, the image of the new virtual appliance is analyzed to determine its virtual machines and the software products includes in each one of them; for example, this result may be achieved by inspecting the configuration file of the new virtual appliance to determine the virtual machines with their virtual disks, and then scanning each virtual disk with Application Program Interface (API) commands provided by the vendor (VDDK in the VMware) to determine the corresponding software programs. Continuing to block 524, the structure information so obtained is saved into the structure repository (by adding a new record with its identifier VAn and a data field equal to its structure information in the above-described format). In this way, the structure information is already available for next deployments of the same new virtual appliance, so as to allow avoiding the above-described operations of discovering (very time and resource consuming).

The flow of activity then merges at block 527 (either from block 518 or from bock 524). In this phase, the configuration information (indicative of the current configuration of the data processing center) is extracted from the configuration repository. For example, the configuration information includes a record for each deployed virtual appliance (already deployed on the data processing center); the record includes the identifier VA of the deployed virtual appliance, the identifiers VMi of its virtual machines, and the identifiers SPi$_j$ of each software program included therein. The configuration information also includes a record for each computer of the data processing center; the record includes an identifier of the computer, and a data field indicating its physical resources (for example, the number of microprocessors), the identifier VAi of each virtual machine emulated thereon, and the virtual resources assigned thereto.

Continuing to block 530, the license condition information (indicative of the license conditions applicable in the data processing center) is extracted from the license condition repository. For example, the license condition information is defined by a record for each license condition; the record includes an identifier LC of the license condition, the identifier VA or SP of the virtual appliance or the software program, respectively, which the license condition applies to, and a data field defined by the following name/value pairs:

LicenseType=myLicenseType
LicenseTarget=myLicenseTarget
LicenseTerm=myLicenseTerm.

The value myLicenseType may a constant VirtualAppliance (when the license condition applies to a whole virtual appliance) or a constant SoftwareProgram (when the license condition applies to a specific software product). Moreover, the value myLicenseTarget may be a constant DataProcessingCenter (when the license condition applies to the whole data processing center), a constant ComputerSubset (when the license condition applies to a subset of computers to be input), or a constant SingleComputer (when the license condition only applies to a single computer to be input). At the end, the value myLicenseTerm may be a constant Install (when the license condition defines a charging according to a number of virtual applications/software products that are installed on the data processing center/subset of computers/computer), the constant Execute (when the license condition defines a charging according to a number of instances of the virtual application/software product that are executed concurrently in the data processing center/subset of computers/computer), or a constant Resource (when the license condition defines a charging according to an amount of a specific resource—such as microprocessors, memory space, or network bandwidth—that is allocated to the virtual application/software product in the data processing center/subset of computers/computer).

With reference now to block 533, a hash table VA_HT (for the license conditions of the virtual appliances) and a hash table SP_HT (for the license conditions of the software programs) are created from the license condition information. Particularly, the hash table VA_HT includes a record for each license condition that applies to a virtual appliance (LicenseType=VirtualAppliance), which is formed by a key field equal to its identifier VA and a data field equal to the corresponding name/value pairs LicenseTarget=myLicenseTarget and LicenseTerm=myLicenseTerm. Likewise, the hash table SP_HT includes a record for each license condition that applies to a software program (LicenseType=SoftwareProgram), which is formed by a key field equal to its identifier SP and a data field equal to the corresponding name/value pairs LicenseTarget=myLicenseTarget and LicenseTerm=myLicenseTerm. In both the hash tables VA_HT and SP_HT, the records are ordered according to their key fields; the records having the same key field (e.g., for the same virtual appliance or software program, respectively) are then ordered according to their LicenseTarget value in decreasing order of coverage extent (e.g., DataProcessingCenter, ComputerSubset and SingleComputer). This operation is required only when the license condition repository is updated (for example, as indicated by a corresponding flag), so that it may be skipped otherwise. The above-described additional feature strongly facilitates the processing of the license conditions during the operation of determining the deployment scheme of the new virtual appliance, with a beneficial effect on its performance.

The process then descends into block 536, wherein the license entitlement information (indicative of the license entitlements available in the data processing center) is extracted from the license entitlement repository. For example, the license entitlement information includes a record for each license condition; the record includes the identifier of the license condition LC and a data field for its entitlement, which is defined by a number that indicates the maximum instances of virtual application/software product that may be installed/executed in the data processing center/ subset of computers/computer or the maximum amount of resources (e.g., microprocessors) that may be allocated thereto (according to the corresponding license condition).

Proceeding to block 539, the deployment scheme of the new virtual appliance (optimized from a license point of view) is determined. For this purpose, the license conditions that apply to the new virtual appliance are extracted from the hash table VA_HT (e.g., the records with the key field VA=VAn), and the license conditions that apply to each one of its software programs are extracted from the hash table SP_HT (e.g., the records with the key field SP=SP$i_j$). A cost function is defined according to these license conditions; the cost function has a set of variables representing the new configuration of the data processing center, as resulting from its current configuration (defined by the configuration information) after the deployment of the new virtual appliance (defined by its structure information)—with these variables that also define the inputs for the name/value pairs LicenseTarget=ComputerSubset and LicenseTarget=SingleComputer. The cost function is also constrained according to the license entitlements (e.g., to fulfill a set of constraints defined according thereto). In this way, a value of the cost function represents the charge associated with the data processing center including the new virtual appliance. The cost function is optimized (with standard operative research techniques), in order to determine the values of its variables (defining the new configuration of the data processing center) that minimize its value (e.g., the corresponding charge) at the same time fulfilling the applicable constraints (ensuring that the data processing center is still compliant with the license entitlements).

The flow of activity then branches at block 542 according to a result of this optimization operation. Particularly, if it is not possible to found any values of the variables of the cost function that fulfill the constraints defined by the license entitlements, the process descends into block 545. In this phase, a warning message is provided to the system administrator. Advantageously, the warning message also includes an indication of the license entitlements that cannot be fulfilled; in addition, it is also possible to include an indication of a reason of the non-compliance (for example, the virtual appliances/software programs whose installation/execution on a single computer, a subset of computers or the whole data processing center would exceed the maximum number, and/ or it would exceed the maximum amount of physical/virtual resources allocated thereto). This helps the system administrator in determining how to update the configuration of the data processing center so as to allow the deployment of the new virtual appliance—for example, by stopping or removing virtual machines, reducing their virtual resources, or enabling additional hardware resources (such as in computers purchased with a Capacity on Demand, or CoD, option).

Conversely, the deployment scheme of the new virtual appliance is determined at block 548 from the variable values in the optimized cost function. Particularly, the deployment scheme indicates any new virtual machines (with their software products) that have to be created in the data processing center (according to the values of the variables associated with the virtual appliance); moreover, the deployment scheme indicates any virtual machines already deployed in the data processing center that have to be customized (according to the values of the variables associated with the current configuration of the data processing center). Continuing to block 551, the deployment scheme is applied to the data processing center. Particularly, the new virtual machines are created, and the corresponding software products are installed thereon (according to the image of the new virtual appliance); the virtual machines of the data processing center (including the new ones just created) are then customized according to the image of the new virtual appliance (to provide the required functionalities) and/or according to the deployment scheme (to fulfill the license entitlements—for example, by updating the virtual resources assigned thereto).

In both cases, the method 500 then ends (either from the block 545 or from the block 551) at the concentric white/ black stop circles 554.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/ or method steps described in connection with any embodiment of the disclosed solution may be incorporated in any other embodiment as a matter of general design choice.

For example, similar considerations apply if the proposed solution is implemented with an equivalent method (by using similar steps, removing some steps being non-essential, or adding further optional steps); moreover, the steps may be performed in a different order, concurrently or in an interleaved way (at least in part).

The same solution lends itself to be applied to deploy virtual appliances with whatever format on a data processing center with whatever architecture. Moreover, nothing prevents consolidating the different repositories into a reduced number of equivalent memory structures (down to a single database). Likewise, the cost function may be defined in any other way (according to the applicable license conditions, the current configuration of the data processing center, and the structure information of the new virtual appliance).

Similar considerations apply to the license entitlement information (for example, which may be stored in a single repository together with the license condition information), and to the corresponding constraints for the cost function (which may be defined in any other way). However, it is pointed out that a simplified implementation of the proposed solution is tenable, wherein no license entitlement is defined and/or the cost function is not constrained at all; for example, this simplified implementation may be used when pay-per-use license s are conditions are provided (when an actual usage of the virtual appliances/software applications is charged, without any limitation thereto), or when it is possible to exceed the license entitlements temporarily (for example, with a corresponding extra charge).

In an alternative implementation, the deployment of the new virtual appliance may be performed even when it is not possible to maintain the data processing center compliant with the license entitlements (by simply providing a corresponding warning message to the system administrator).

Conversely, the warning message that is provided when the deployment of the new virtual appliance is not possible may include any additional or different pieces of information (for example, from a simple error code to a suggestion of possible actions to be taken to solve the problem).

Alternatively, the deployment of the new virtual appliance only performs the creation of the new virtual machines automatically, whereas the customization of the deployed virtual machines is always conditioned to an explicit approval of the system administrator. In any case, a basic implementation of the proposed solution wherein the optimization of the cost function is only based on the new virtual appliance (without any possibility of updating the other virtual appliances already deployed on the data processing center) is contemplated; in this case, the definition of the new configuration of the data processing center in the cost function only has variables for the structure information of the new virtual appliance, whereas the current configuration of the data processing center is represented with constants.

The structure information of the new virtual appliance may also be determined in a different way. For example, the appliance repository may be pre-loaded with information provided by external sources, or it may be shared among multiple data processing centers (updating and accessing it); moreover, the structure information may be derived from other elements of the image of the new virtual appliance (for example, the EulaSection element of the OVF descriptor file). In any case, the possibility of determining this structure information always by extracting it from the appliance repository or by discovering it from the image of the new virtual appliance is not excluded.

The step of creating the hash tables is not strictly necessary, and it may be omitted in a simplified implementation of the proposed solution; conversely, it is possible to create additional hash tables based on the content of the configuration repository, the license condition repository, the license entitlement repository and/or the appliance repository. In any case, the hash tables may be in a different number (down to a single one) and/or with a different organization.

The above-described format of the configuration repository is merely exemplificative; moreover, the configuration information may include additional and/or different data (for example, without information about the physical/virtual resources when they are not relevant for the license conditions).

Moreover, the above-described format of the license condition repository is merely exemplificative; moreover, the cited examples of license conditions should not be interpreted in a limitative manner (for example, with similar considerations that apply to license conditions based on the amount of available physical/virtual computational power).

Likewise, the above-described format of the license entitlement repository is merely exemplificative; moreover, the cited examples of license entitlements should not be interpreted in a limitative manner (for example, with similar considerations that apply to license entitlements conditions based on the maximum amount of physical/virtual computational power that may be used).

The proposed solution may be implemented as a stand-alone module, as a plug-in for a managing module of the data processing center, or even directly in the managing module itself. It would be readily apparent that it is also possible to deploy the same solution as a service that is accessed through a network. Similar considerations apply if the program (which may be used to implement various embodiments) is structured in a different way, or if additional modules or functions are provided; likewise, the memory structures may be of other types, or may be replaced with equivalent entities (not necessarily consisting of physical storage media). In any case, the program may take any form suitable to be used by any data processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to various embodiments lends itself to be implemented even with a hardware structure (for example, integrated in a chip of semiconductor material), or with a combination of software and hardware suitably programmed on otherwise configured.

The proposed method may also be carried out on a system based on a different architecture. In any case, each computer of the data processing center may have another structure or may include similar elements (such as cache memories temporarily storing the programs or parts thereof); in any case, it is possible to replace each computer with any data processing system (e.g., code execution entity), or with a combination of multiple entities.

What is claimed is:

1. A deployment method for deploying a new virtual appliance on a data processing center including one or more computers configured to each host one or more virtual machines, the new virtual appliance including one or more new virtual machines which each include one or more new software programs, wherein the deployment method includes steps comprising:
    determining structure information of the new virtual appliance, the structure information of the new virtual appliance including an indication of the one or more new virtual machines and an indication of the one or more new software programs, wherein the determining of the structure information comprises verifying an inclusion of the structure information of the new virtual appliance in an appliance repository that includes structure information of each one of a plurality of known virtual appliances previously deployed on the data processing center, the determining of the structure information further comprising retrieving the structure information of the new virtual appliance from the appliance repository in response to the inclusion, or discovering the structure information from an image of the new virtual appliance and saving the structure information of the new virtual appliance into the appliance repository otherwise;
    retrieving configuration information indicative of a current configuration of the data processing center;
    retrieving license condition information indicative of license conditions applicable to the data processing center, wherein the retrieving of the license condition information comprises creating a first hash table including the license conditions for the virtual appliances each one being directly accessible through an identifier of the corresponding virtual appliance, and a second hash table including the license conditions for the software programs each one being directly accessible through an identifier of the corresponding software program;

determining a deployment scheme of the virtual appliance on the data processing center, the determination of the deployment scheme being performed by optimizing a cost function based on the license condition information, the configuration information and the structure information; and deploying the new virtual appliance according to the deployment scheme;

wherein the license condition information includes an indication of a first set of license conditions each one for a corresponding virtual appliance, and an indication of a second set of license conditions each one for a corresponding software program.

2. The deployment method according to claim 1, further including steps comprising:

retrieving license entitlement information indicative of license entitlements available in the data processing center, the determination of the deployment scheme being further performed by constraining the cost function to fulfill a set of constraints defined according to the license entitlement information, wherein fulfilling the set of constraints ensures compliance with the license entitlements.

3. The deployment method according to claim 2, wherein the step of deploying the new virtual appliance is conditioned to the fulfillment of the constraints by the cost function, the deployment method further including a step comprising:

providing a warning message in response to the missing fulfillment of the constraints by the cost function, the warning message including an indication of each license entitlement corresponding to a constraint that cannot be fulfilled.

4. The deployment method according to claim 3, wherein the warning message is provided prior to deploying the new virtual appliance, and wherein the warning message further includes an indication of a reason of the non-fulfillment of each constraint, the method further comprising:

determining how to reconfigure the one or more computers or the one or more virtual machines to achieve fulfillment of the constraints.

5. The deployment method according to claim 2, wherein each of the license entitlements defines a maximum number of instances of a corresponding virtual appliance or software program that may be installed or executed on a single one of the computers, a subset of the computers or the data processing center, and/or a maximum amount of physical resources or virtual resources that may be allocated thereto.

6. The deployment method according to claim 1, wherein the deployment scheme includes an indication of said one or more new virtual machines to be created in the data processing center and an indication of a customization of each one of a plurality of customizable virtual machines of the data processing center to be customized, the step of deploying the new virtual appliance including:

creating the new virtual machines and customizing the customizable virtual machines according to the corresponding customization.

7. The deployment method according to claim 1, wherein the configuration information includes an indication of at least one deployed virtual appliance already deployed on the data processing center, of a plurality of deployed virtual machines of each deployed virtual appliance, of at least one deployed software program included in each of the plurality of deployed virtual machines, of physical resources of each of said one or more computers, or of virtual resources assigned to each of the plurality of deployed virtual machines.

8. The deployment method according to claim 1, wherein each of the license conditions is based on a number of instances of a corresponding virtual appliance or software program that is installed or executed on a single one of the computers, a subset of said one or more computers or the data processing center, or on an amount of physical resources or virtual resources that are allocated thereto.

9. The deployment method according to claim 1, further including steps comprising:

retrieving license entitlement information indicative of license entitlements available in the data processing center, the determination of the deployment scheme being further performed by optimizing the cost function towards fulfilling a set of constraints defined according to the license entitlement information, wherein the set of constraints may be exceeded temporarily.

10. The deployment method according to claim 1, wherein the determining of the structure information of the new virtual appliance comprises either extracting the structure information from an appliance repository or discovering the structure information from an image of new virtual appliance.

11. The deployment method according to claim 1, wherein the step of deploying the new virtual appliance is conditioned on constraining the cost function to fulfill a set of constraints defined according to license entitlement information, the method further comprising:

making a determination that the set of constraints will not be fulfilled by optimizing the cost function; and providing, prior to deploying the new virtual appliance, a warning message in response to making the determination, the warning message including an indication of each license entitlement corresponding to a constraint that will not be fulfilled.

12. The deployment method according to claim 11, further comprising:

determining a reconfiguration of the one or more computers or the one or more virtual machines to achieve fulfillment of the constraints, and updating the configuration information and the structure information to reflect the reconfiguration;

wherein the deployment scheme for the new virtual appliance is based on said reconfiguration.

13. A deployment method for deploying a new virtual appliance on a data processing center including one or more computers configured to each host one or more virtual machines, the new virtual appliance including one or more new virtual machines which each include one or more new software programs, wherein the deployment method includes steps comprising:

determining structure information of the new virtual appliance, the structure information of the new virtual appliance including an indication of the one or more new virtual machines and an indication of the one or more new software programs;

retrieving configuration information indicative of a current configuration of the data processing center;

retrieving license condition information indicative of license conditions applicable to the data processing center;

retrieving license entitlement information indicative of license entitlements available in the data processing center, the determination of the deployment scheme being further performed by constraining the cost function to fulfill a set of constraints defined according to the license entitlement information, wherein fulfilling the set of constraints ensures compliance with the license entitlements;

determining a deployment scheme of the virtual appliance on the data processing center, the determination of the deployment scheme being performed by optimizing a cost function based on the license condition information, the configuration information and the structure information;

providing information about how to reconfigure the one or more computers to achieve fulfillment of the constraints by adding Capacity on Demand (CoD) hardware resources or providing information about how to reconfigure the one or more virtual machines to achieve fulfillment of the constraints by indicating a number of virtual machines to stop or remove;

determining how to reconfigure the one or more computers or the one or more virtual machines to achieve fulfillment of the constraints, and deploying the new virtual appliance according to the deployment scheme, the deploying of the new virtual appliance being conditioned to the fulfillment of the constraints by the cost function, wherein the deploying of the new virtual appliance further comprises providing a warning message in response to the missing fulfillment of the constraints by the cost function, the warning message including an indication of each license entitlement corresponding to a constraint that cannot be fulfilled and an indication of a reason of the non-fulfillment of each constraint, the warning message being provided prior to deploying the new virtual appliance, wherein the warning message further includes an indication of a reason of the non-fulfillment of each constraint.

* * * * *